United States Patent [19]

Nakano et al.

[11] Patent Number: 5,543,175
[45] Date of Patent: Aug. 6, 1996

[54] METHOD FOR FORMING A SCALE PREVENTIVE COATING FILM ON INNER WALL SURFACES OF A POLYMERIZATION VESSEL

[75] Inventors: Toshihiko Nakano; Tadashi Amano; Yoshitaka Okuno, all of Kamisu-machi, Japan

[73] Assignee: Shin-Etsu Chemical Co., Ltd., Tokyo, Japan

[21] Appl. No.: 330,386

[22] Filed: Oct. 27, 1994

[30] Foreign Application Priority Data

Oct. 28, 1993 [JP] Japan .................... 5-292601

[51] Int. Cl.⁶ .................... B05D 7/22; B05D 1/02
[52] U.S. Cl. .................... 427/236; 427/235; 427/238; 427/295
[58] Field of Search .................... 427/235, 236, 427/238, 237, 318, 295, 421

[56] References Cited

U.S. PATENT DOCUMENTS

| | | | |
|---|---|---|---|
| 2,932,586 | 4/1960 | Wilson et al. | 427/238 |
| 3,110,610 | 11/1963 | Goodell | 427/318 |
| 3,314,815 | 4/1967 | Erwin et al. | 427/318 |
| 3,376,152 | 4/1968 | Okamoto et al. | 427/237 |
| 3,702,780 | 11/1972 | Withers | 427/295 |
| 3,894,576 | 7/1975 | Stoy et al. | 427/231 |
| 4,200,712 | 4/1980 | Cohen | 427/236 |
| 4,260,653 | 4/1981 | Martignoni et al. | 427/295 |
| 4,267,291 | 5/1981 | Jones | 427/237 |
| 4,351,859 | 9/1982 | Hartmann | 427/238 |
| 4,413,021 | 11/1983 | Hentschel et al. | 427/236 |
| 4,432,840 | 2/1984 | Liau et al. | 427/236 |
| 4,450,189 | 5/1984 | Laroche | 427/236 |
| 4,495,225 | 1/1985 | Ciuba et al. | 427/236 |
| 5,139,823 | 8/1992 | Boscan-Romero et al. | 427/236 |
| 5,288,521 | 2/1994 | Maldaner | 427/295 |
| 5,336,523 | 6/1994 | Chater | 427/295 |
| 5,420,215 | 5/1995 | Amano et al. | 526/74 |

FOREIGN PATENT DOCUMENTS

| | | | |
|---|---|---|---|
| 158617 | 1/1983 | Germany | 427/238 |
| 51577 | 1/1976 | Japan | 427/238 |

*Primary Examiner*—Diana Dudash
*Attorney, Agent, or Firm*—Sughrue, Mion, Zinn, Macpeak & Seas

[57] ABSTRACT

The method of the present invention lies in a method for forming a scale preventive coating for preventing polymer scale deposition generated on inner walls of a polymerization vessel during polymerization, wherein a coating liquid containing a scale preventive agent is sprayed from an upper portion in the closed polymerization vessel, suction of gas in the vessel is simultaneously performed from a bottom portion of the polymerization vessel, an excessive coating liquid is discharged, and a coating of the scale preventive agent is formed on inner walls of the polymerization vessel. According to this method, a coating of a scale preventive agent can be uniformly formed throughout the entire inner walls of a polymerization vessel even in the case of a closed and large polymerization vessel having a volume, for example, not less than 80 m³. Especially, it is extremely suitable for large scale industrial production because a coating can be effectively formed even on portions such as a valve at the bottom of the polymerization vessel. Further, operations (heating, spraying, suction) for coating formation can be allowed to proceed simultaneously, and discharge of an excessive coating liquid is simultaneously performed. Thus it also becomes possible to greatly reduce the time required for the coating formation operations.

3 Claims, 1 Drawing Sheet

METHOD FOR FORMING A SCALE PREVENTIVE COATING FILM ON INNER WALL SURFACES OF A POLYMERIZATION VESSEL

BACKGROUND OF THE INVENTION

1. Field of the Invention

The present invention relates to a method for forming a scale preventive coating on inner walls of a polymerization vessel, and in particular relates to a method for forming a scale preventive agent coating which is applied to a polymerization vessel for use in polymerization of a monomer having an ethylenically unsaturated double bond.

2. Description of the Prior Art

In the prior art, methods for polymerization of a monomer having an ethylenically unsaturated double bond have been known, such as suspension, emulsion, solution, gas phase and bulk polymerization processes and the like. In any of these polymerization processes, polymer scale is liable to be deposited on the areas with which a monomer comes into contact, such as inner walls, stirring equipment and so on of a polymerization vessel.

The deposition of the polymer scale results in disadvantages that the yield of the polymer and cooling capacity of the polymerization vessel are lowered, and that the polymer scale may peel off and mix into a polymeric product, thereby impairing the quality of formed products obtained by processing the polymeric product. In addition, removal of deposited polymer scale is very laborious and time-consuming. Further, the polymer scale contains unreacted monomers, and thus an operation of scale removal involves a risk of physical disorders.

Heretofore, a method for preventing polymer scale deposition on inner wall surfaces of a polymerization vessel has been known, that is a method in which a coating of a polymer scale deposition preventive agent is formed on inner wall surfaces and so on of a polymerization vessel.

As such a method, for example, Japanese Patent Publication (KOKOKU) No. 1-31522 discloses a method in which a liquid scale preventive agent is applied by spraying to inner walls of a polymerization vessel by using an application apparatus including a two-fluid (liquid-gas) spray nozzle arranged inside the polymerization vessel.

Further, Japanese Patent Publication (KOKOKU) No. 1-38544 proposes a method in which vinyl chloride gas is used as a carrier, and a coating substance (scale preventive agent) is coated on surfaces of a reaction vessel in a mist state by using an appropriate spray nozzle arranged in the reaction vessel.

However, when polymerization is performed in an industrial scale, a large polymerization vessel having large capacity is generally used. Further, from viewpoints of influence of monomer gas to human body and loss of monomer gas and so on, it is desired to continuously perform polymerization in a closed polymerization system without opening a polymerization vessel.

However, in the case of a method in which a scale preventive agent is applied by means of a spray procedure as in the prior arts described above, it is difficult to uniformly and evenly form a scale preventive coating on inner wall surfaces of a large polymerization vessel having a volume, for example, not less than 80 m$^3$. Namely, a spray nozzle for spraying a scale preventive agent is generally arranged at an upper portion in a polymerization vessel, however, a distance between the nozzle and the bottom of the polymerization vessel becomes longer as the polymerization vessel becomes large, and thus it becomes difficult to transport an enough amount of droplets of the scale preventive agent coating liquid to the bottom of the polymerization vessel. As a result, it becomes difficult to uniformly form a scale preventive coating on inner walls of the polymerization vessel.

The tendency as described above becomes more conspicuous in a closed polymerization system. For example, when spraying is performed by using a spray nozzle in a closed polymerization vessel, the gas in the vessel is subjected to retention at a lower portion of the polymerization vessel, and a flow of gas to reach the lower portion of the polymerization vessel becomes difficult to occur. Thus it becomes more difficult to apply a sufficient amount of a scale preventive agent to lower portions of inner wall surfaces of a polymerization vessel, a lower portion of a stirring shaft, an opening valve and peripheral portions around a valve seat, and it is impossible to effectively prevent occurrence of scale deposition on these portions.

Therefore, the methods of the prior art described above are not suitable for industrial production. Especially, the scale deposition on the opening valve and peripheral portions around the valve seat is a serious problem, wherein opening and closing operations of the opening valve even become impossible during a procedure of repeated polymerization. In such a case, means of lengthening the spray time, increasing the spray amount and so on may be thought of in order to form a sufficient scale preventive coating on lower portions of a polymerization vessel, however, any of them has large disadvantages in time and economy, and cannot provide a fundamental solution.

SUMMARY OF THE INVENTION

Accordingly it is a task of the present invention to provide a method for forming a scale preventive coating suitable for industrial production, and provide a method which enables uniform and even formation of a coating of a scale preventive agent throughout inner wall surfaces of a large polymerization vessel having a volume, for example, not less than 80 m$^3$.

According to the present invention, there is provided a method for forming a scale preventive coating on inner wall surfaces of a polymerization vessel, comprising spraying a coating liquid containing a scale preventive agent from an upper portion in the polymerization vessel while performing suction of gas in the vessel to the outside from a bottom portion of the closed polymerization vessel.

According to this method, a coating of a scale preventive agent can be uniformly and evenly formed on all surfaces with which reaction components may come into contact during polymerization, such as inner wall surfaces of a polymerization vessel as a matter of course, as well as its equipped instruments, for example, a baffle, stirring vanes, a stirring shaft, a nozzle, a condenser, an opening valve, peripheral portions around a valve seat and so on.

Namely, in the present invention, the suction of gas from the bottom portion of the polymerization vessel, which is performed simultaneously with supply of a coating liquid of a scale preventive agent, forms a gas flow directing downward in the polymerization vessel. Accordingly the coating liquid can be supplied throughout inner walls of the polymerization vessel even in the case of use of a large polymerization vessel having a volume, for example, not less than 80 m³, and a coating of a scale preventive agent can be uniformly formed even on an opening valve and peripheral portions around a valve seat provided at the bottom of the polymerization vessel, being extremely suitable for large scale industrial production.

A coating liquid of a scale preventive agent can be sprayed by using a spray nozzle provided, for example, at an upper portion in a polymerization vessel, while the gas in the polymerization vessel can be sucked to the outside through a suction line provided through an opening valve provided at a bottom portion of the polymerization vessel, and an extra coating liquid can be also discharged by means of the suction. Further, upon supply of the coating liquid of a scale preventive agent and upon suction of the gas in the vessel, it is preferable to heat the polymerization vessel simultaneously therewith by using a water jacket or the like provided on an outer wall or the like of the polymerization vessel. If such heating is performed, drying is achieved simultaneously with supply of the coating liquid of a scale preventive agent. Thus it becomes possible to promptly form a coating of the scale preventive agent, and it becomes possible to achieve great reduction in time, resulting in further improvement in productivity.

Further, the method of the present invention has its extremely high industrial value because it can be also effectively applied to polymerization vessels made of stainless steel which are said to easily cause scale deposition.

DETAILED DESCRIPTION OF THE INVENTION

Coating liquid of scale preventive agent

Figure 1:
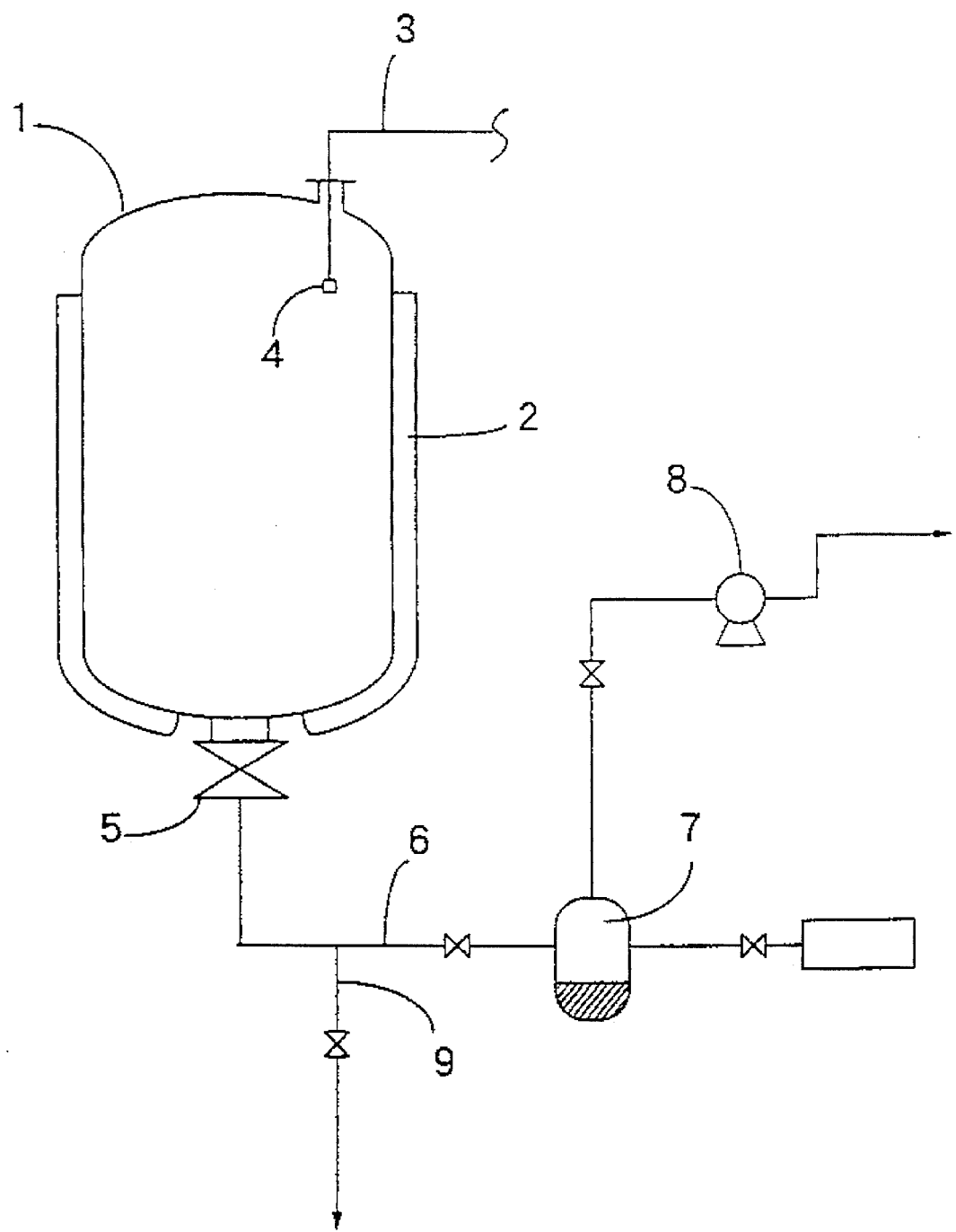
FIG. 1 is a schematic view of a polymerization apparatus for preferably carrying out the method of the present invention.

The scale preventive agent, which is used for preventing scale deposition on wall surfaces of a polymerization vessel, is used as a solution or a dispersion prepared by mixing it with an appropriate solvent, namely as a coating liquid.

As the solvent described above to be used for the preparation of the coating liquid, for example, there may be exemplified alcohols such as methanol, ethanol and the like; ketones such as acetone, methyl ethyl ketone, diethyl ketone and the like; polar solvents such as N,N-dimethylformamide, dimethyl sulfoxide and the like; ethers such as furfural, tetrahydrofuran and the like; halogenated hydrocarbons such as ethylene dichloride, methylene chloride and the like; aromatic hydrocarbons such as benzene, toluene and the like; water; and mixed solvents thereof. The concentration of a scale preventive agent in the coating liquid differs depending on a type of the scale preventive agent and so on, however, it is appropriately in a range of 0.001–5% by weight in general.

Those per se known may be used as the scale preventive agent, however, condensation products of aromatic compounds are especially preferable. The condensation products include those obtained by reacting an aromatic amine compound with an aromatic nitro compound in the presence of a condensation catalyst at a temperature of 100°–250° C.; those obtained by base formation of such a condensation product with an alkali metal salt or an ammonium compound (see Japanese Patent Publication (KOKOKU) No. 60-30681); a straight chain or branched chain polyaromatic amine having a molecular weight of not less than about 250 (see Japanese Patent Publication (KOKOKU) Nos. 59-16561 and 60-54323); a solution obtained by dissolving a self-condensation product of a polyvalent phenol in an aqueous solution of an alkali metal salt (see Japanese Patent Publication (KOKOKU) No. 62-3841); a reaction product of pyrogallol or hydroxyhydroquinone and an aromatic aldehyde (see Japanese Patent Publication (KOKOKU) No. 60-59246); a quinone-amine compound having an average molecular weight of not less than 3000 obtained by making addition reaction of an aromatic diamine and an aromatic quinone in a single solvent or a mixed solvent having a solubility parameter of 9.0–12.2 or in a mixed solvent containing an alcohol of an equal or less weight with respect to it, and performing precipitation and separation (see Japanese pre-examination Patent publication (KOKAI) No. 61-7309) and the like. They can be used singly or in combination of two or more. Further, other than these condensation products, those described in the following patent documents can be preferably used:

Japanese pre-examination Patent Publication (KOKAI) Nos. 52-8089, 53-13689, 55-155001, 60-233103, 61-31406, 61-34006, 62-18402 and 63-175002;

Japanese pre-examination Patent publication (KOKAI) Nos. 3-181503, 3-131602, 3-111401, 2-47104, 2-117901, 2-117902, 2-155902, 2-155903, 2-138302, 2-158601, 2-158602, 2-202901, 3-115304, 3-115305, 3-115306, 2-292302, 2-292303, 2-138303, 3-95202 and 4-50202;

Japanese Patent Publication (KOKOKU) Nos. 45-30343, 45-30835, 48-29871, 51-21672, 51-37306, 51-37308, 52-24953, 53-6023, 53-6024, 53-6025, 53-6026, 53-46235, 59-1413, 59 -41443, 62-20201, 56-5442, 56-5443, 59-34721, 56-5444, 58 -11884, 62-9122, 62-9123, 59-31522, 60-30682, 62-30203, 62 -30204, 60-48522, 61-52161, 61-52162, 63-56882, 63-56884 and 63-57441;

Japanese Patent Publication (KOKOKU) Nos. 1-38121, 2-32283, 3-70723, 1-19801, 1-29484, 1-29485 and 1-29486;

Japanese pre-examination Patent publication (KOKAI) Nos. 51-50887 and 55-54317;

Japanese Patent Application No. 5-201842 and so on.

Formation of coating

The formation of the scale preventive coating according to the present invention can be performed by using the coating liquid of the scale preventive agent described above, and using, for example, a polymerization apparatus shown in FIG. 1.

In FIG. 1, a water jacket 2 is provided on an outer wall of a polymerization vessel 1, and a spray nozzle 4 connected to a coating liquid supply line 3 for a scale preventive agent is provided at an upper portion in the polymerization vessel 1. The spray nozzle 4 may be known one such as a one-fluid nozzle, a two-fluid nozzle and the like, the number of which is not limited to one, and a plurality of nozzles may be arranged. With respect to a condition of spray application, it is preferable that the spray pressure is usually 2–20 kg/cm² G, especially 3–8 kg/cm² G.

Further, an opening valve 5 is provided at a bottom portion of the polymerization vessel 1, and a suction line 6 is connected through the opening valve 5. A suction pump 8 is provided in the suction line 6 through a gas/liquid separator 7. Namely, gas in the vessel and an excessive coating liquid sucked from the inside of the polymerization vessel 1 are subjected to gas/liquid separation by the gas/liquid separator 7, the gas in the vessel is discharged, and the recovered coating liquid is reused. Further, the suction line 6 is connected to a slurry take-out line 9, and a slurry generated by polymerization is taken out through this line 9.

In the present invention, usually the suction pump 8 is operated simultaneously with spraying of a coating liquid from the spray nozzle 4 while heating the polymerization vessel 1 by using the water jacket 2, and the gas in the vessel and the excessive coating liquid are sucked into the suction line 6 through the opening valve 5. Namely, a gas flow flowing from the top to the bottom is formed in the polymerization vessel 1 owing to the function of the suction line 6. Thus the coating liquid sprayed from the spray nozzle 4 spreads uniformly over the entire vessel even in the case of a large polymerization vessel, and it becomes possible to form a uniform coating of the scale preventive agent also on bottom portions. In addition, the condition of suction by the pump is preferably set to be 10–160 m$^3$/minute, especially 20–80 m$^3$/minute.

Further, the temperature of the jacket 2 usually has an optimum temperature of about 40°–100° C., whereby drying is performed simultaneously with application of the coating liquid. Thus the coating of the scale preventive agent can be promptly formed. In this case, drying can be also performed more rapidly by previously heating the coating liquid, for example, to about 20°–100° C.

Incidentally, it is preferable that the coating weight of the scale preventive agent upon completion of coating formation on inner walls of the polymerization vessel 1 is generally in a range of 0.0005–5g/m$^2$, especially 0.001–1 g/m$^2$.

Carrying out of polymerization

After achieving the formation of the scale preventive coating as described above, the opening valve 5 is closed, and predetermined polymerization components are supplied to the inside of the polymerization vessel 1 to perform polymerization by means of an ordinary process. During this event, since the scale preventive coating is uniformly formed on the entire inner walls of the polymerization vessel 1, scale deposition on the inner walls of the polymerization vessel is effectively prevented, and deterioration of polymer quality and productivity due to such scale deposition can be effectively avoided.

The method of the present invention is applied to prevention of scale deposition during polymerization of various monomers, however, it is especially applied extremely effectively to polymerization of monomers having an ethylenically unsaturated double bond, such as for example polymerization of halogenated vinyls such as vinyl chloride and the like; vinyl esters such as vinyl acetate, vinyl propionate and the like; acrylic acid, methacrylic acid and esters or salts thereof; maleic acid, fumaric acid and esters or anhydrides thereof; dienes such as butadiene, chloroprene, isoprene and the like; halogenated vinylidenes such as vinylidene chloride and the like; various vinyl ethers and the like. Among them, the method of the present invention is effective on suspension polymerization and emulsion polymerization of vinyl chloride, vinylidene chloride and monomer mixtures mainly containing them; production of beads and latexes of polymers such as polystyrene, polymethylmethacrylate, polyacrylonitrile and the like; production of synthetic rubbers such as SBR, NBR, CR, IR, IIR and the like (usually performed by emulsion polymerization); production of ABS resins and the like, and it has the most remarkable effect on polymerization or copolymerization of vinyl chloride and vinylidene chloride.

Further, the scale preventive effect of the scale preventive coating is not impaired at all even in the case of presence of various polymerization components added other than monomers, such as for example polymerization initiators (catalyst), dispersion media such as water and the like, suspending agents, solid dispersion agents, nonionic or anionic liquid dispersion agents or the like, fillers, plasticizers, stabilizers, chain transfer agents, pH adjustors and the like.

Accordingly, there is no limitation to the polymerization type, and the method of the present invention can be applied to any of suspension, emulsion, solution and bulk polymerizations and so on to express a desired scale preventive effect.

In addition, the formation of the scale preventive coating performed prior to execution of polymerization is not necessarily performed for every one batch of polymerization, which can be performed for every plural times of polymerization batches considering, for example, a degree of deposition of polymer scale. The latter case is preferable from a viewpoint of productivity.

EXAMPLES

The method of the present invention will be explained below in accordance with Examples and Comparative Examples, however, the present invention is not limited thereto.

Production of polymer scale deposition preventive agent (condensation product)

Production of condensation product No. 1

1.00 mole of aniline, 0.310 mole of hydrochloric acid, 0,227 mole of nitrobenzene and 0.103 mole of ferric chloride were charged into a reaction vessel and mixed. An obtained mixture was heated at 60° C. for 6 hours, and then the mixture was reacted at 180°–185° C. for 15 hours while distilling water off. During this reaction, since aniline and nitrobenzene were also distilled together with water, distilled aniline and nitrobenzene were recovered, and returned to the reaction vessel described above. Next, the mixture in the reaction vessel was further heated at 200° C. for 5 hours, and an obtained reaction mixture (melted matter) was introduced into dilute sulfonic acid, and heated at 60° C. for 3 hours, followed by filtration during a hot state to remove unreacted aniline. Subsequently hydrochloric acid is removed from a filtrated product by washing with water 5–6 times to perform drying to obtain a condensation product No. 1.

Production of condensation product No. 2

1.00 mole of m-phenylenediamine, 0.10 mole of hydrochloric acid and 0.83 mole of resorcinol were charged into a reaction vessel and mixed. An obtained mixture was heated at 60° C. for 1 hour, and then the temperature was raised to 300° C. over 2 hours while removing generated ammonia. Cooling was started at a time point when the temperature reached 300° C., the temperature was returned to room temperature over 1 hour, and a solid condensation product No. 2 was obtained.

Production of condensation product No. 3

3 moles of pyrogallol was dissolved in 2 liters of water. An obtained aqueous solution was added with 2 moles of benzaldehyde and 6 moles of phosphoric acid, and reacted at 100° C. for 4 hours.

An obtained reaction mixture was filtered, and excessive phosphoric acid was removed by washing 5–6 times, followed by drying to obtain a condensation product No. 3.

Production of condensation product No. 4

800 g of methanol, 100 g of dimethylformamide (DMF) and 40 g of 4,4-diaminodiphenylsulfone were charged into a reaction vessel having an internal volume of 2 liters equipped with a reflux cooler, and stirred at room temperature to dissolve 4,4'-diaminodiphenylsulfone in methanol/DMF. This solution was added with 60 g of α-naphthoquinone, and the temperature was raised to 65° C. to perform reaction at a temperature of 65° C. for 24 hours. An obtained mixture liquid was cooled and added dropwise to water. A deposited precipitate was filtrated and dried, whereby a condensation product No. 4 was obtained.

Preparation of scale preventive coating liquid

Preparation of coating liquid No. 1

Methanol was added to the condensation product No. 1 to provide a concentration of 1.0% by weight, and a methanol solution of the condensation product No. 1 was prepared. The obtained methanol solution was designated as a coating liquid No. 1.

Preparation of coating liquid No. 2

Methanol was added to the condensation product No. 1 to provide a concentration of 2.0% by weight, and a methanol solution of the condensation product No. 1 was prepared. The obtained methanol solution was designated as a coating liquid No. 2.

Preparation of coating liquid No. 3

Methanol was added to the condensation product No. 2 to provide a concentration of 1.0% by weight, and a methanol solution of the condensation product No. 2 was prepared. The obtained methanol solution was designated as a coating liquid No. 3.

Preparation of coating liquid No. 4

Methanol was added to the condensation product No. 3 to provide a concentration of 1.0% by weight, and a methanol solution of the condensation product No. 3 was prepared. The obtained methanol solution was designated as a coating liquid No. 4.

Preparation of coating liquid No. 5

100 parts by weight of the condensation product No. 4 was mixed with:

(1) 100 parts by weight of gelatin;

(2) 100 parts by weight of colloidal silica (particle diameter: 5–7 μm, Snowtex CXS-9 made by Nissan Chemical Industries, Ltd.);

(3) sodium hydroxide; and (4) water/methanol mixed solvent (weight ratio of 70:30);

to prepare a coating liquid No. 5. Incidentally, the condensation product No. 4, (1) and (2) were allowed to have a total amount concentration of 0.5% by weight, and pH of the liquid was adjusted to 11.0.

Example 1

A polymerization apparatus having a structure as shown in FIG. 1 was assembled by using a polymerization vessel 1 having a volume of 80 m$^3$ made of stainless steel equipped with a stirring equipment and a jacket for raising temperature and cooling.

The jacket was set to have a temperature of 50° C., a suction pump was operated under a suction condition of 40 m$^3$/minute, and suction was started through a gas-liquid separator through an opening valve at a bottom portion of the polymerization vessel. Further, by simultaneously using a one-liquid type spray nozzle attached at an upper portion in the polymerization vessel, the coating liquid No. 1 previously heated to 5° C. was sprayed onto inner wall surfaces of the polymerization vessel under a condition of a liquid feed pressure of the coating liquid of 6 kg/cm$^2$. After continuing the suction and spraying for 6 minutes (amount of the coating liquid used: 10 liters), the pump and spraying were stopped, and the inner walls of the polymerization vessel were washed with water for 2 minutes to form a dried coating of a scale preventive agent.

Next, the polymerization vessel was opened to observe a formation state of the scale preventive coating on the inner walls, and then the polymerization vessel was tightly closed again. After replacement with nitrogen, the polymerization vessel was charged with:

35 tons of deionized water at 35° C.;

8.1 kg of partially saponified polyvinyl alcohol (saponification degree: 80.0 mole %, average polymerization degree: 2550); and 5.4 kg of hydroxypropylmethylcellulose (hydroxypropoxy substitution degree: 8.9% by weight, viscosity at 20° C. of 2% by weight aqueous solution: 49.5 cps).

Next, after deaeration until achieving an internal pressure in the polymerization vessel of 60 mmHg;

30 tons of vinyl chloride monomer; was charged, and further;

22.2 kg of di-2-ethylhexylperoxydicarbonate; was introduced under pressure with stirring by using a high pressure pump, simultaneously with which the temperature raising was started to begin polymerization.

The polymerization reaction was continued under stirring while maintaining the polymerization temperature at 58° C. The polymerization was stopped at a time point at which the internal pressure in the polymerization vessel was 6.0 kg/cm$^2$ G, unreacted monomers were recovered, an obtained polymer slurry was taken out from the polymerization vessel, and the inside of the vessel was washed with water.

After continuously performing 100 batches of polymerization provided that the operation described above was regarded as 1 batch, the scale deposition amount was measured. Results are shown in Table 1. Incidentally, a measurement method was in accordance with the following method.

Measurement of polymer scale deposition amount

Measurement is performed for three places of a central part (part having a height of ½ of that of the polymerization vessel), a lower part (part having a height of ¼ of that of the polymerization vessel) and an upper part (part having a height of ¾ of that of the polymerization vessel) of the inner wall of the polymerization vessel.

At a predetermined place of each of the parts, the scale deposited on an area of a 10 cm square is respectively scraped off with a spatula and weighed, and its measured value is multiplied by 100 to obtain a scale deposition amount per 1 m$^2$.

Example 2

Formation of a scale preventive coating and polymerization were performed, and the scale deposition amount was measured exactly in the same manner as in Example 1, except that the coating liquid No. 2 was used as a coating liquid containing a scale preventive agent. Results are shown in Table 1.

Example 3

Formation of a scale preventive coating and polymerization were performed, and the scale deposition amount was measured exactly in the same manner as in Example 1, except that the coating liquid No. 3 was used as a coating liquid containing a scale preventive agent. Results are shown in Table 1.

Example 4

Formation of a scale preventive coating and polymerization were performed, and the scale deposition amount was measured exactly in the same manner as in Example 1 except that the coating liquid No. 4 was used as a coating liquid containing a scale preventive agent. Results are shown in Table 1.

Example 5

Formation of a scale preventive coating and polymerization were performed, and the scale deposition amount was measured exactly in the same manner as in Example 1 except that the coating liquid No. 5 was used as a coating liquid containing a scale preventive agent. Results are shown in Table 1.

Example 6

Formation of a scale preventive coating and polymerization were performed, and the scale deposition amount was measured exactly in the same manner as in Example 1 except that the spray nozzle at the upper portion in the polymerization vessel was replaced with a two-fluid spray nozzle as disclosed in Japanese Patent Publication (KOKOKU) No. 1-31522, the internal pressure of the polymerization vessel was −600 mmHg (gauge pressure), the coating liquid No. 1 was supplied to the nozzle under a pressure of 6 kg/cm$^2$ G, vinyl chloride heated and gasified at 50° C. was supplied to the nozzle under a pressure of 7 kg/cm$^2$ G, and 10 liters of the coating liquid was finely sprayed from the nozzle to form a coating of a scale preventive agent. Results are shown in Table 1.

Example 7

Formation of a scale preventive coating and polymerization were performed, and the scale deposition amount was measured exactly in the same manner as in Example 6 except that the coating liquid No. 2 was used as a coating liquid containing a scale preventive agent. Results are shown in Table 1.

Example 8

Formation of a scale preventive coating and polymerization were performed, and the scale deposition amount was measured exactly in the same manner as in Example 6 except that the coating liquid No. 3 was used as a coating liquid containing a scale preventive agent. Results are shown in Table 1.

Example 9

Formation of a scale preventive coating were performed, and the scale deposition amount was measured exactly in the same manner as in Example 6 except that the coating liquid No. 4 was used as a coating liquid containing a scale preventive agent. Results are shown in Table 1.

Example 10

Formation of a scale preventive coating and polymerization were performed, and the scale deposition amount was measured exactly in the same manner as in Example 6 except that the coating liquid No. 5 was used as a coating liquid containing a scale preventive agent. Results are shown in Table 1.

Example 11

Formation of a scale preventive coating and polymerization were performed, and the scale deposition amount was measured exactly in the same manner as in Example 6 except that the measurement of the scale deposition amount was performed after 750 batches in Example 6. Results are shown in Table 2.

Comparative Example 1

Polymerization was performed, and the scale deposition amount was measured exactly in the same manner as in Example 1 except that the spraying time of the coating liquid for the scale preventive agent No. 1 was 1 minute (without performing suction by the pump) followed by being left for 6 minutes, and then washing was performed with water for 2 minutes, whereby a scale preventive coating was formed. Results are shown in Table 1.

Comparative Example 2

Formation of a scale preventive coating and polymerization were performed, and the scale deposition amount was measured exactly in the same manner as in Comparative Example 1 except that the coating liquid No. 3 was used as a coating liquid containing a scale preventive agent. Results are shown in Table 1.

Comparative Example 3

Formation of a scale preventive coating and polymerization were performed, and the scale deposition amount was measured exactly in the same manner as in Comparative Example 1 except that the coating liquid No. 4 was used as a coating liquid containing a scale preventive agent. Results are shown in Table 1.

Comparative Example 4

Formation of a scale preventive coating and polymerization were performed, and the scale deposition amount was measured exactly in the same manner as in Comparative Example 1 except that the coating liquid No. 5 was used as a coating liquid containing a scale preventive agent. Results are shown in Table 1.

Comparative Example 5

Polymerization was performed, and the scale deposition amount was measured exactly in the same manner as in Example 6 except that the spraying time of the coating liquid for the scale preventive agent was 1 minute (without performing suction by the pump) followed by being left for 6 minutes, and then washing was performed with water for 2 minutes, whereby a scale preventive coating was formed. Results are shown in Table 1.

Comparative Example 6

Formation of a scale preventive coating and polymerization were performed, and the scale deposition amount was measured exactly in the same manner as in Comparative Example 5 except that the coating liquid No. 3 was used as a coating liquid containing a scale preventive agent. Results are shown in Table 1.

Comparative Example 7

Formation of a scale preventive coating and polymerization were performed, and the scale deposition amount was measured exactly in the same manner as in Comparative Example 5 except that the coating liquid No. 4 was used as a coating liquid containing a scale preventive agent. Results are shown in Table 1.

Comparative Example 8

Formation of a scale preventive coating and polymerization were performed, and the scale deposition amount was measured exactly in the same manner as in Comparative Example 5 except that the coating liquid No. 5 was used as a coating liquid containing a scale preventive agent. Results are shown in Table 1.

Comparative Example 9

Formation of a scale preventive coating and polymerization were performed, and the scale deposition amount was measured exactly in the same manner as in Comparative Example 5 except that the measurement of the scale deposition amount was performed after 750 batches in Comparative Example 5. Results are shown in Table 2.

TABLE 1

| Application liquid No. | State of coating formation | Scale deposition amount* (g/m$^2$) | | |
|---|---|---|---|---|
| | | Upper | Center | Lower |
| Ex. 1 | 1 | Coating was | 0.1 | 0 | 0 |
| Ex. 2 | 2 | formed uniformly | 0.1 | 0 | 0 |
| Ex. 3 | 3 | on entire inner | 0.3 | 0.1 | 0.1 |
| Ex. 4 | 4 | walls of | 0.2 | 0.1 | 0 |
| Ex. 5 | 5 | polymerization | 0.1 | 0 | 0 |
| Ex. 6 | 1 | vessel. | 0.1 | 0 | 0 |
| Ex. 7 | 2 | | 0.1 | 0 | 0.1 |
| Ex. 8 | 3 | | 0.2 | 0.1 | 0.1 |
| Ex. 9 | 4 | | 0.2 | 0.1 | 0.1 |
| Ex. 10 | 5 | | 0.1 | 0 | 0 |
| Com. Ex. 1 | 1 | Coating formation | 0.1 | 0 | 85 |
| Com. Ex. 2 | 3 | was insufficient | 0.1 | 0 | 90 |
| Com. Ex. 3 | 4 | at lower part of | 0.2 | 0.1 | 100 |
| Com. Ex. 4 | 5 | polymerization | 0.1 | 0.1 | 60 |
| Com. Ex. 5 | 1 | vessel especially | 0.1 | 0 | 70 |
| Com. Ex. 6 | 3 | around opening | 0.2 | 0.1 | 80 |
| Com. Ex. 7 | 4 | value. | 0.2 | 0.1 | 95 |
| Com. Ex. 8 | 5 | | 0.1 | 0 | 55 |

*Scale deposition amount is a measured value after 100 batches.

TABLE 2

| Application liquid No. | Scale deposition amount* (g/m$^2$) | | | Remark |
|---|---|---|---|---|
| | Upper | Center | Lower | |
| Ex. 11 | 1 | 0.4 | 0.1 | 0.2 | |
| Com. Ex. 9 | 1 | — | — | — | Experiment was stopped due to no operation of opening valve after about 700 batches. |

*Scale deposition amount is a measured value after 750 batches.

What is claimed is:

1. A method for forming a scale preventive coating on inner wall surfaces of a polymerization vessel, comprising spraying a coating liquid containing a scale preventive agent from an upper portion in the polymerization vessel which has been previously closed, while performing suction of gas in the vessel to the outside from a bottom portion of the closed polymerization vessel to thereby discharge excessive coating liquid to the outside, and while heating the polymerization vessel using a water jacket provided on an outer wall of the polymerization vessel so as to perform drying of the scale preventive coating liquid applied on said inner wall surfaces, said polymerization vessel having an internal volume of not less than 80 m$^3$.

2. The method according to claim 1, wherein said spraying is performed through a spray nozzle under a spray pressure in the range of 2 to 20 kg/cm$^2$ G.

3. The method according to claim 1, wherein the suction of gas is in the range of 10 to 160 m$^3$/minute.

* * * * *